(12) United States Patent
Cover

(10) Patent No.: US 6,418,736 B1
(45) Date of Patent: Jul. 16, 2002

(54) ICE LEVEL DETECTOR

(75) Inventor: Steven Cover, Senoia, GA (US)

(73) Assignee: Hoshizaki America, Inc., Peachtree City, GA (US)

( * ) Notice: Subject to any disclaimer, the term of this patent is extended or adjusted under 35 U.S.C. 154(b) by 0 days.

(21) Appl. No.: 09/884,119

(22) Filed: Jun. 20, 2001

(51) Int. Cl.[7] .............................................. F25C 1/00
(52) U.S. Cl. .......................................... 62/137; 62/344
(58) Field of Search ....................... 62/137, 139, 228.2, 62/344; 340/617

(56) References Cited

U.S. PATENT DOCUMENTS

| | | | |
|---|---|---|---|
| 444,719 A | * 1/1891 | Senner | 297/116 |
| 3,277,666 A | * 10/1966 | Simmons | 414/293 |
| 3,712,076 A | * 1/1973 | Fox | 62/137 |
| 3,885,400 A | 5/1975 | Webb | 62/137 |
| 3,911,691 A | 10/1975 | Kohl et al. | 62/137 |
| 4,095,439 A | * 6/1978 | Linstromberg | 312/274 |
| 4,628,699 A | * 12/1986 | Mawby et al. | 62/137 |
| 4,662,182 A | 5/1987 | Tsukiyama et al. | 62/137 |
| 4,947,652 A | 8/1990 | Arcangeli | 62/71 |
| 4,993,232 A | * 2/1991 | Tatematsu et al. | 62/137 |
| 5,119,639 A | * 6/1992 | Bein et al. | 62/137 |
| 5,131,234 A | 7/1992 | Furukawa et al. | 62/137 |
| 5,142,878 A | 9/1992 | Hida et al. | 62/137 |

* cited by examiner

Primary Examiner—William E. Tapolcai
Assistant Examiner—Mohammad M Ali
(74) Attorney, Agent, or Firm—Arent Fox Kintner Plotkin & Kahn, PLLC

(57) ABSTRACT

An ice level detector includes a bracket, an actuator lever and a switch mechanism. The bracket extends along and laterally from a longitudinal axis. The actuator lever has a first arm member and a second arm member angularly attached to each other to form an elbow. The actuator lever is pivotally connected to the bracket at the elbow for pivotal movement about a pivot axis that extends perpendicularly to the longitudinal axis. The first and second arm members extend away from each other relative to the elbow and downwardly relative to the longitudinal axis. The switch mechanism is operative in conjunction with the bracket and first arm member for providing a first signal when the first arm member is disposed adjacent the switch mechanism at a first angle less than a threshold angle and a second signal different from the first signal when the first arm member is disposed apart from the switch mechanism at a second angle greater than the threshold angle.

20 Claims, 10 Drawing Sheets

ICE LEVEL DETECTOR

FIELD OF THE INVENTION

The invention relates to an ice level detector for use within an ice bin to detect a full ice level state of ice therein. More particularly, the invention is directed to an ice level detector having an actuator lever that pivots about a pivot axis.

BACKGROUND OF THE INVENTION

Various ice level detectors are known in the art and employ various components for detecting the level of ice in an ice bin. Some ice level detectors use ultrasound detectors while others use photo eye detectors. One particular type of ice level detector uses a pivoting actuator lever that is disposed within the ice bin.

U.S. Pat. No. 4,610,147 to Kawasumi teaches an ice detector for an ice making machine that includes an ice storage switch main body, a detecting switch and an ice product detecting lever. The ice storage switch main body is mounted to an inner ceiling wall of an ice reservoir and the ice product detecting lever is pivotably mounted to a supporting shaft on the ice storage switch main body. A stopper is provided in the reservoir for contacting the ice product detecting lever which is held in a non-vertical position by the stopper.

U.S. Pat. No. 4,662,182 to Tsukiyama et al. teaches an ice product storage detector that instantaneously detects when the ice products have filled an ice reservoir to its full capacity or when the amount of ice product in the reservoir has decreased. The ice storage detector includes a proximity switch that is mounted on a barrier plate of non-magnetic material positioned at an upper part of the ice reservoir. The ice storage detector device is provided in the ice reservoir in positional registration with the proximity switch. An ice product storage detector plate is arranged in conjunction with the ice product storage detector device and is pivotably carried within the ice reservoir by a shaft. An auxiliary detector plate formed of a magnetizable material is provided on the ice product storage detector plate parallel to the detective surface of the proximity switch. When the ice product storage detector plate pivots about the shaft as a result of falling ice products, the auxiliary detector plate pivots away from a mating position with a detecting surface of the proximity switch detecting a fill level of the ice products in the ice reservoir.

U.S. Pat. No. 4,947,652 to Arcangeli teaches an ice level control for a flake ice maker. The ice level control includes an extension shaft bent at a right angle to form a carrier arm which supports a sensor paddle. The paddle is freely pivotable throughout the carrier arm and has an upper contact portion vented to a trailing angle. An overall length of the extension shaft and the sensor paddle is such that the lower end of.the sensor paddle is at a level within the ice bin at which level it is desirable to limit further ice accumulation in the bin.

SUMMARY OF THE INVENTION

An ice level detector includes a bracket, an actuator lever and a switch mechanism. The bracket extends along and laterally from a longitudinal axis. The actuator lever has a first arm member and a second arm member angularly attached to each other to form an elbow. The actuator lever is pivotably connected to the bracket at the elbow for pivotable movement about a pivot axis that extends perpendicularly to the longitudinal axis. The first and second arm members extend away from each other relative to the elbow and downwardly relative to the longitudinal axis. The switch mechanism is operative in conjunction with the bracket and the first arm member. The switch mechanism provides a first signal and a second signal that is different from the first signal. The first signal is provided when the first arm member is disposed adjacent the switch mechanism at a first angle that is less than a threshold angle. The second signal is provided when the first arm member is disposed apart from the switch mechanism at a second angle which is greater than the threshold angle.

The switch mechanism causes an ice maker to be either an ice-making state or in a shut-off state. The ice maker is in the ice-making state when the second arm is disposed within an ice bin at an ice-making position rendering the first arm member to be in contact with or adjacent the switch mechanism. The ice maker is in the shut-off state when the second arm is disposed within the ice bin at a stop making-ice position rendering the first arm member to be disposed apart from the switch mechanism. The ice accumulating in the ice bin and being produced by the ice maker in the ice-making state applies a force to the second arm member to move the second arm member from the ice-making position to the stop making-ice position.

BRIEF OF DESCRIPTION OF THE DRAWINGS

Advantages of the invention will become apparent from the following detailed description of the exemplary embodiments taking in conjunction with the accompanying drawings, in which.

DETAILED DESCRIPTION OF THE EXEMPLARY EMBODIMENTS OF THE INVENTION

Figure 1:
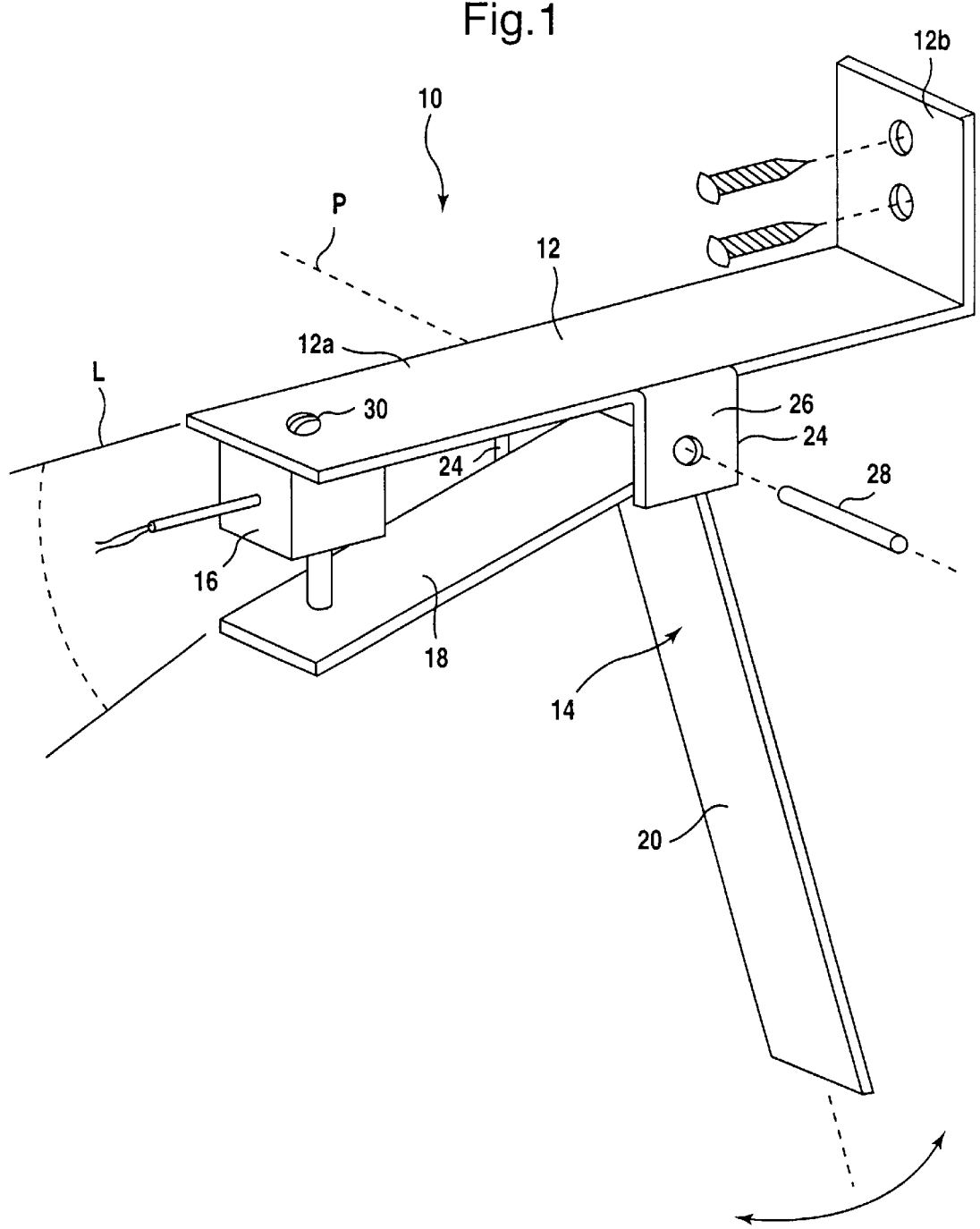
FIG. 1 is a perspective view of a first exemplary embodiment of an ice level detector of the invention.
Figure 2:
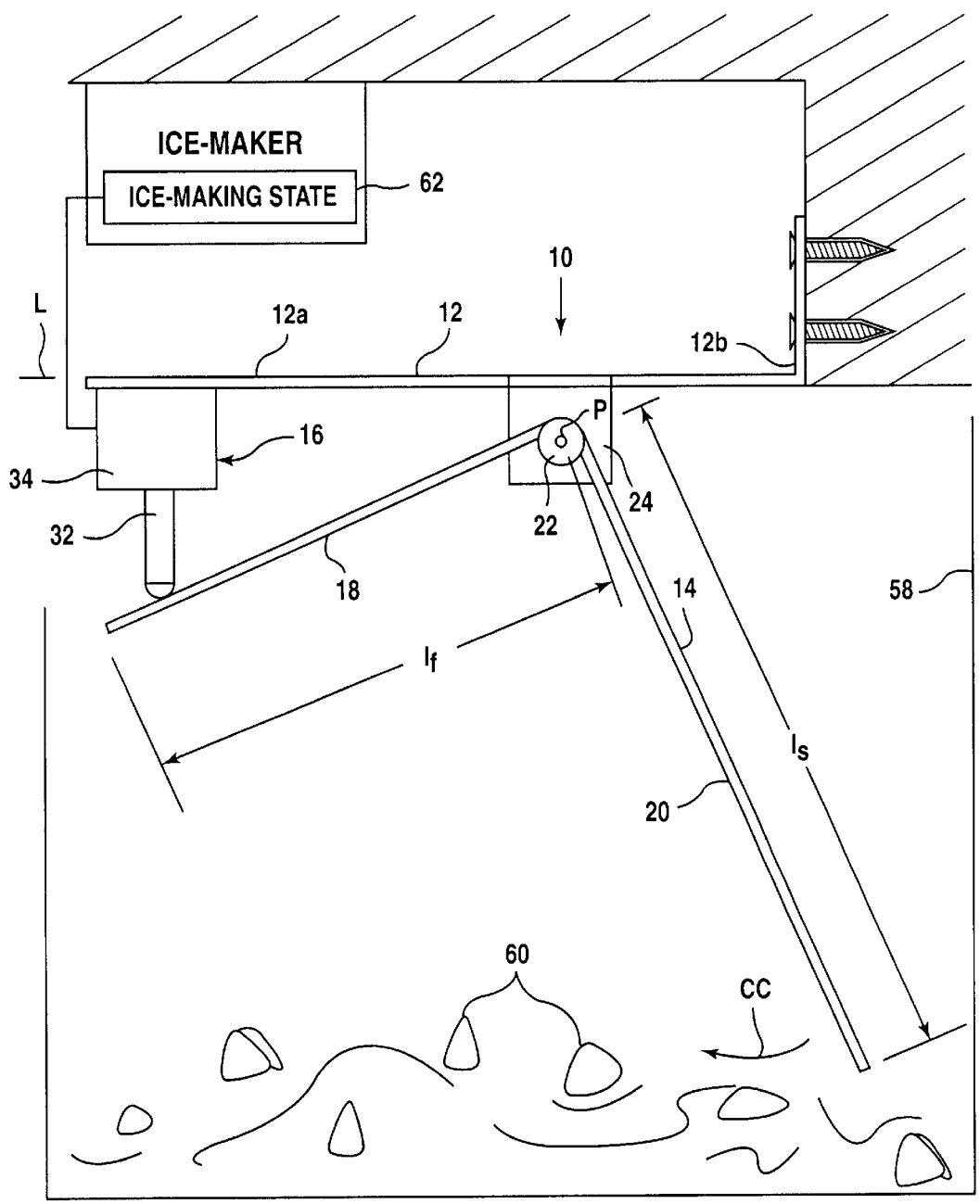
FIG. 2 is a side elevational view in cross-section of the ice level detector of the invention in FIG. 1 disposed within an ice bin and operably connected to an ice maker machine in an ice-making state.
Figure 3:
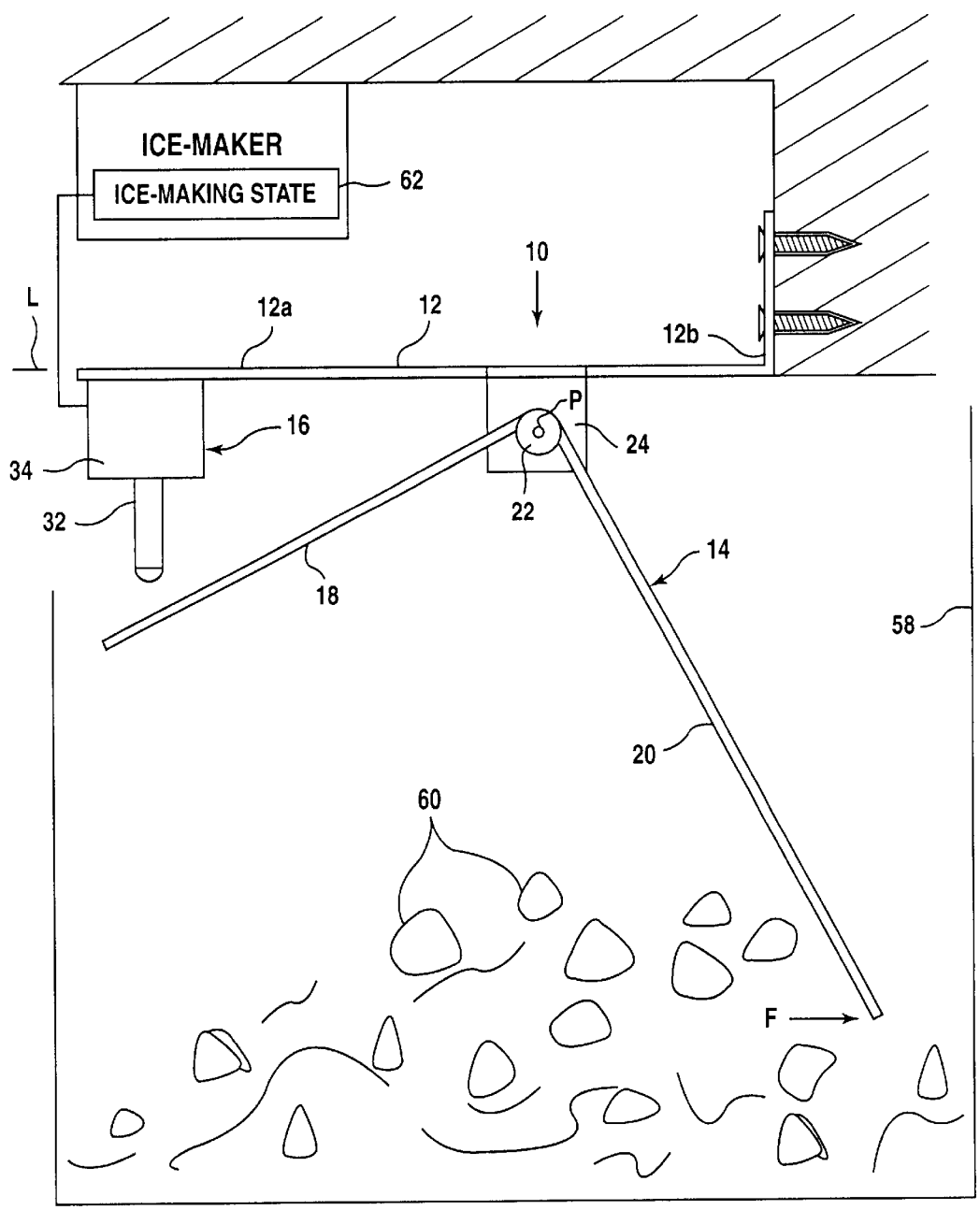
FIG. 3 is a side elevational view in cross-section of the ice level detector of the invention in FIG. 1 operably connected to the ice maker machine in a shut-off state.

A first exemplary embodiment of an ice level detector 10 of the invention is introduced in FIGS. 1–5. The ice level detector 10 of the invention includes a bracket 12, an actuator lever 14 and a switch mechanism 16. The bracket 12 extends along and laterally from a longitudinal axis L. The actuator lever 14 has a first arm member 18 and a second arm member 20. As best shown in FIGS. 2–3, the first arm member 18 and the second arm member 20 are angularly attached to each other to form an elbow 22. The actuator lever 14 is pivotably connected to the bracket 12 at the elbow 22 so that the actuator lever 14 moves pivotably about a pivot axis P as shown in FIGS. 1–3. The pivot axis P extends perpendicularly relative to the longitudinal axis L as best illustrated in FIG. 1. With reference to FIGS. 2–3, the first arm member 18 and the second arm member 20 extend away from each other relative to the elbow 22 and also extend downwardly relative to the longitudinal axis L.

Figure 4:
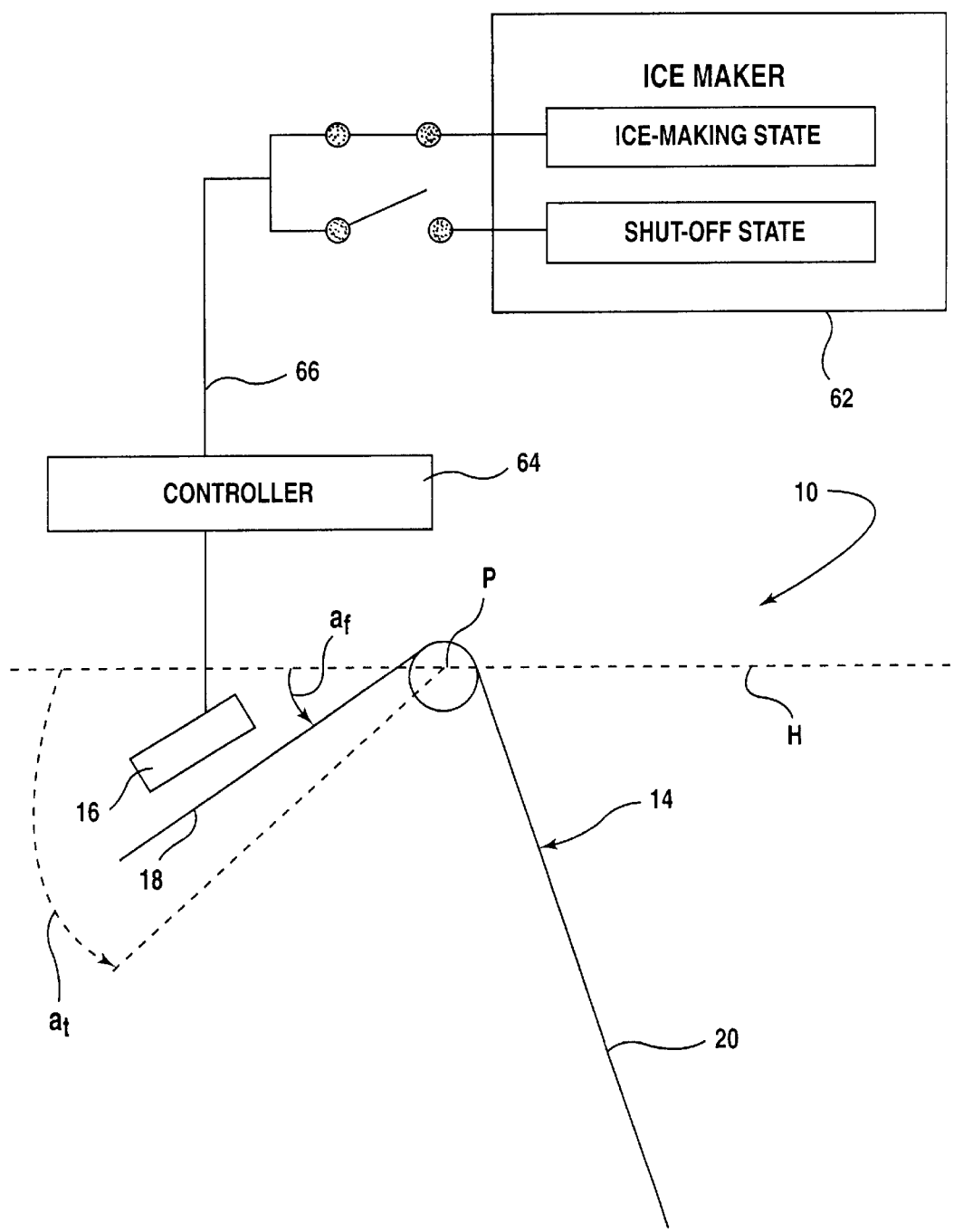
FIG. 4 is a schematic view of the ice level detector of the invention with the ice maker machine in the ice-making state.
Figure 5:
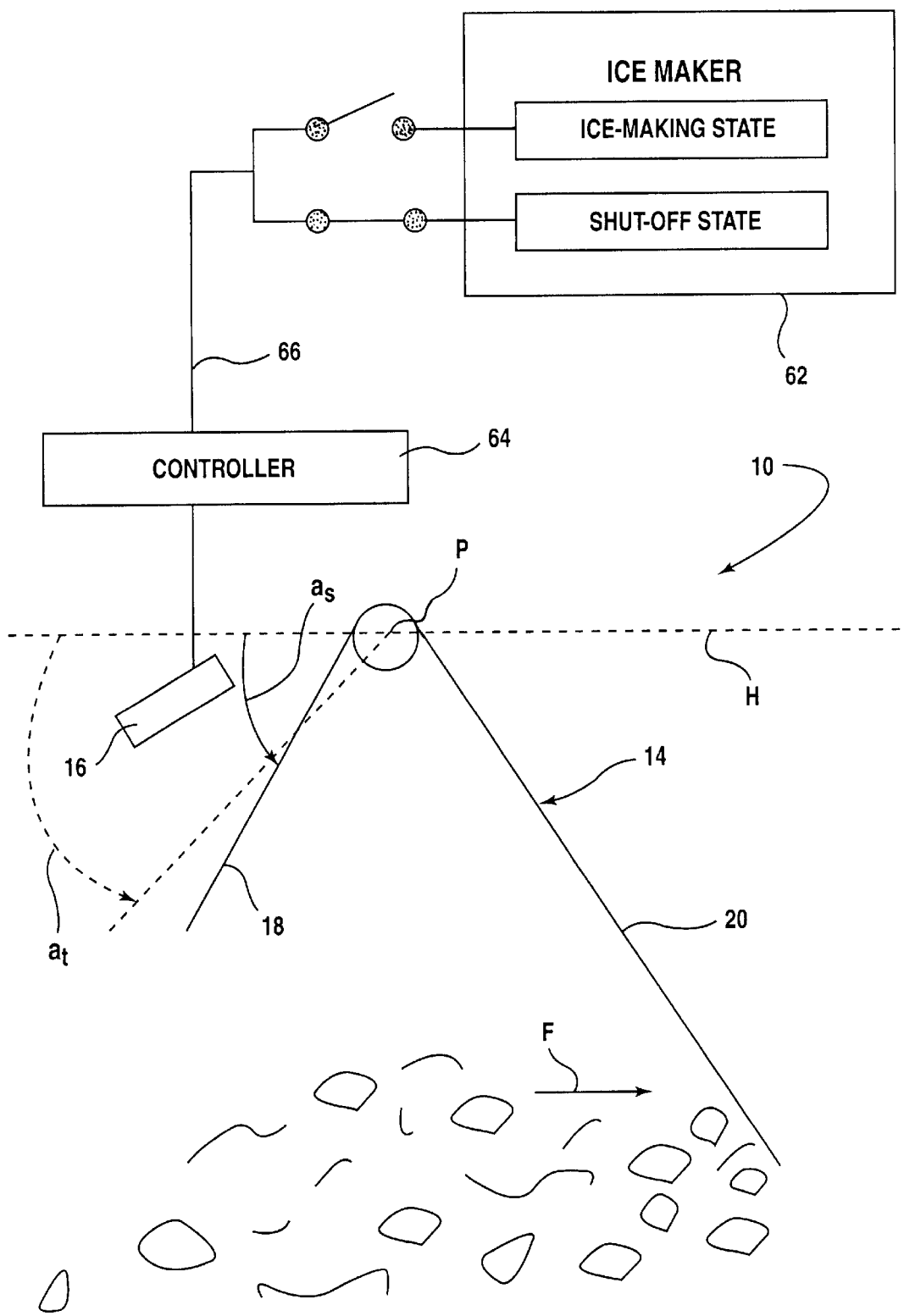
FIG. 5 is a schematic view of the ice level detector of the invention with the ice maker machine in the shut-off state.

The switch mechanism 16 illustrated in FIG. 1 as a conventional damper switch, is operative in conjunction with the bracket 12 and the firm arm member 18. As is known in the art, the switch mechanism 16 provides a first signal and a second signal that is different from the first signal. One in ordinary skill of the art would appreciate that the first signal might be electrical current whereas the second signal might be a lack of electrical current or vice versa. As illustrated in FIG. 4, the switch mechanism 16 provides the first signal when the first arm member 18 is disposed adjacent the switch mechanism 16 at a first angle $a_f$ that is less than a threshold angle $a_t$, that is measured relative to an imaginary horizontal line extending through the pivot axis P. As illustrated in FIG. 5, the switch mechanism 16 provides the second signal when the first arm member 18 is disposed apart from the switch mechanism 16 at a second angle as which is greater than the threshold angle $a_t$, a skilled artisan would appreciate that the threshold angle at is arbitrary and is used for explanation purposes only to determine when an any type. of switch mechanism switches between its first and second signals.

As best shown in FIG. 1, the bracket 12 includes a pair of downwardly depending hanger tabs 24. The pair of hanger tabs 24 are spaced apart from one another at a distance for receiving the elbow 22. Each one of the hanger tabs 24 has a hole 26 extending therethrough along and about the pivot axis P. A pivot pin 28 is sized and adapted to extend through the pair of hanger tabs 24 and the elbow 22 through the hole 26 so that the actuator lever 24 can pivot about the pivot axis P. Also, the bracket 12 has a proximal end portion 12a and a distal end portion 12b which is disposed opposite the proximal end portion 12a. The switch mechanism 16 is connected to the proximal end portion 12a of the bracket 12, for example, by a conventional fastener 30 such as a screw or bolt. For the first exemplary embodiment of the ice level detector 10 of the invention, the distal end portion 12b of the bracket 12 extends perpendicularly upwardly relative to the longitudinal axis L.

As shown in FIG. 2, the first arm member 18 has a first arm length $l_f$ and the second arm member 20 has a second arm length $l_s$, that is longer than the first arm length $l_{(f)}$. It is preferred that the first and second arm members 18 and 20 are fabricated from an identical material such as bar stock. As a result, the second arm member 20 is heavier than the first arm member 18 which, in turn, causes the actuator lever 14 to be weight biased in a counterclockwise direction CC shown in FIG. 2. Thus, the first arm member 18 pushes a damper 32 on the switch mechanism 16 inwardly relative to the switch mechanism housing 34.

Figure 6:
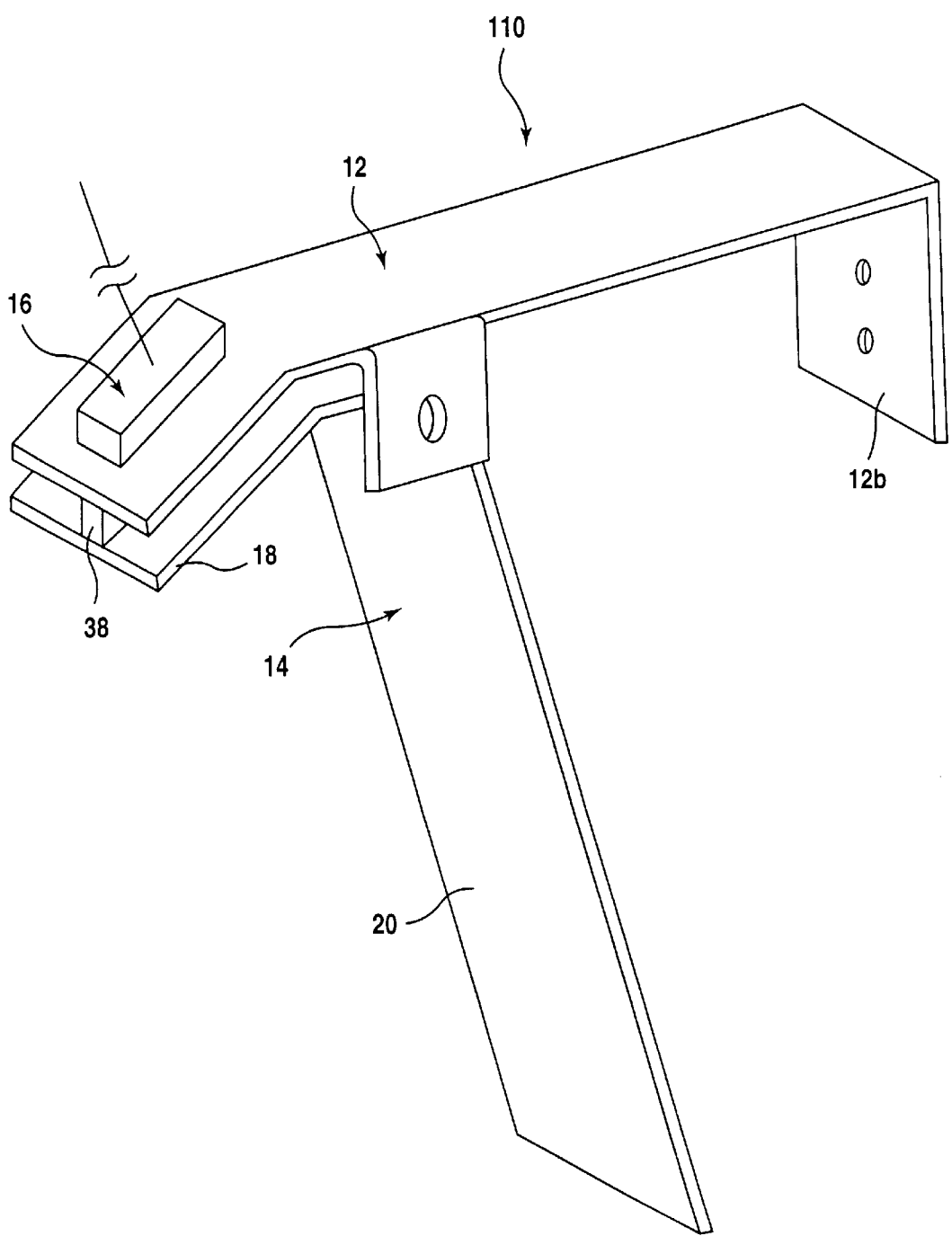
FIG. 6 is a perspective view of a second exemplary embodiment of the ice level detector of the invention.
Figure 7:
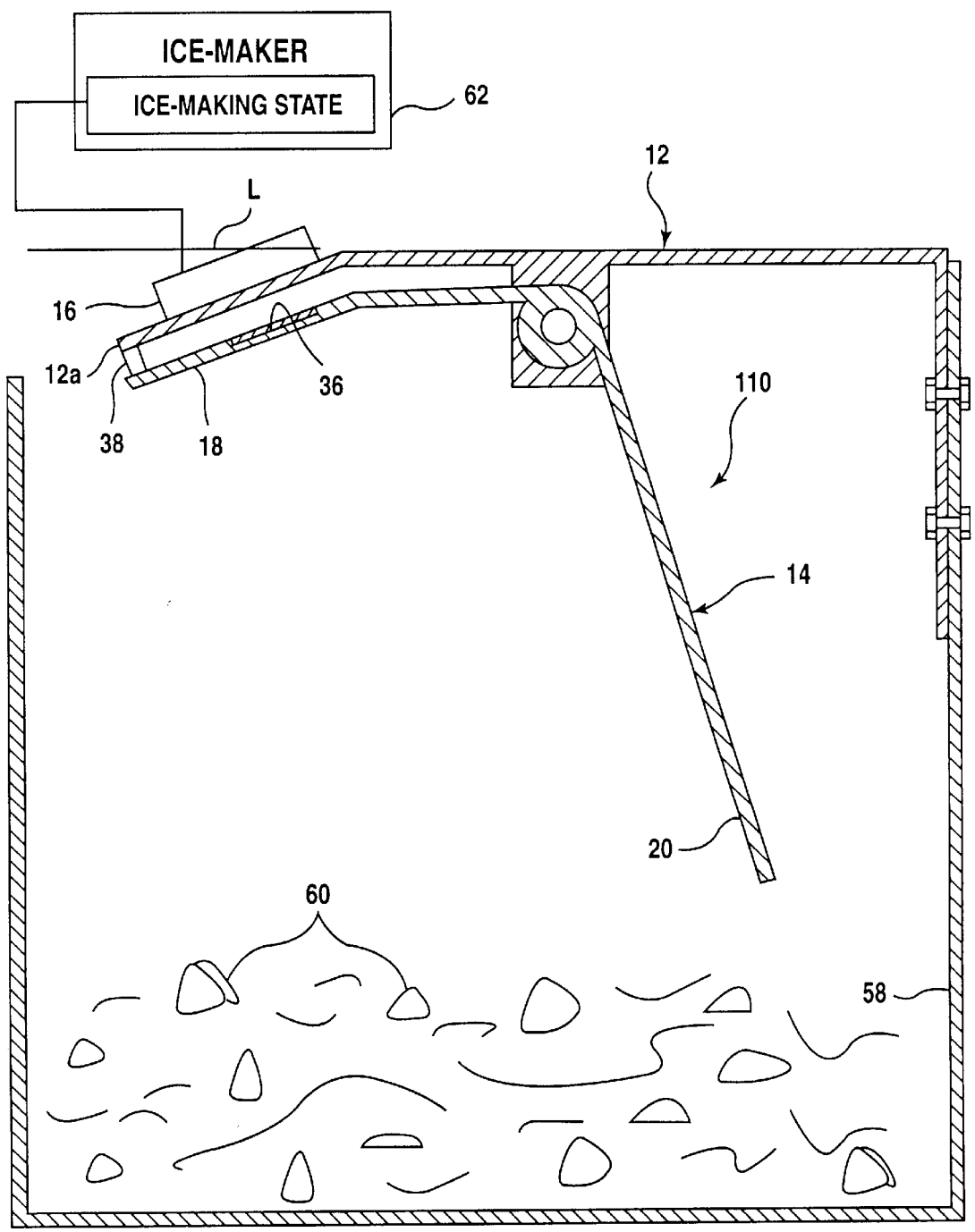
FIG. 7 is a side elevational view in cross-section of the ice level detector in FIG. 6 disposed within the ice bin and operably connected to the ice maker machine in the ice-making state.
Figure 8:
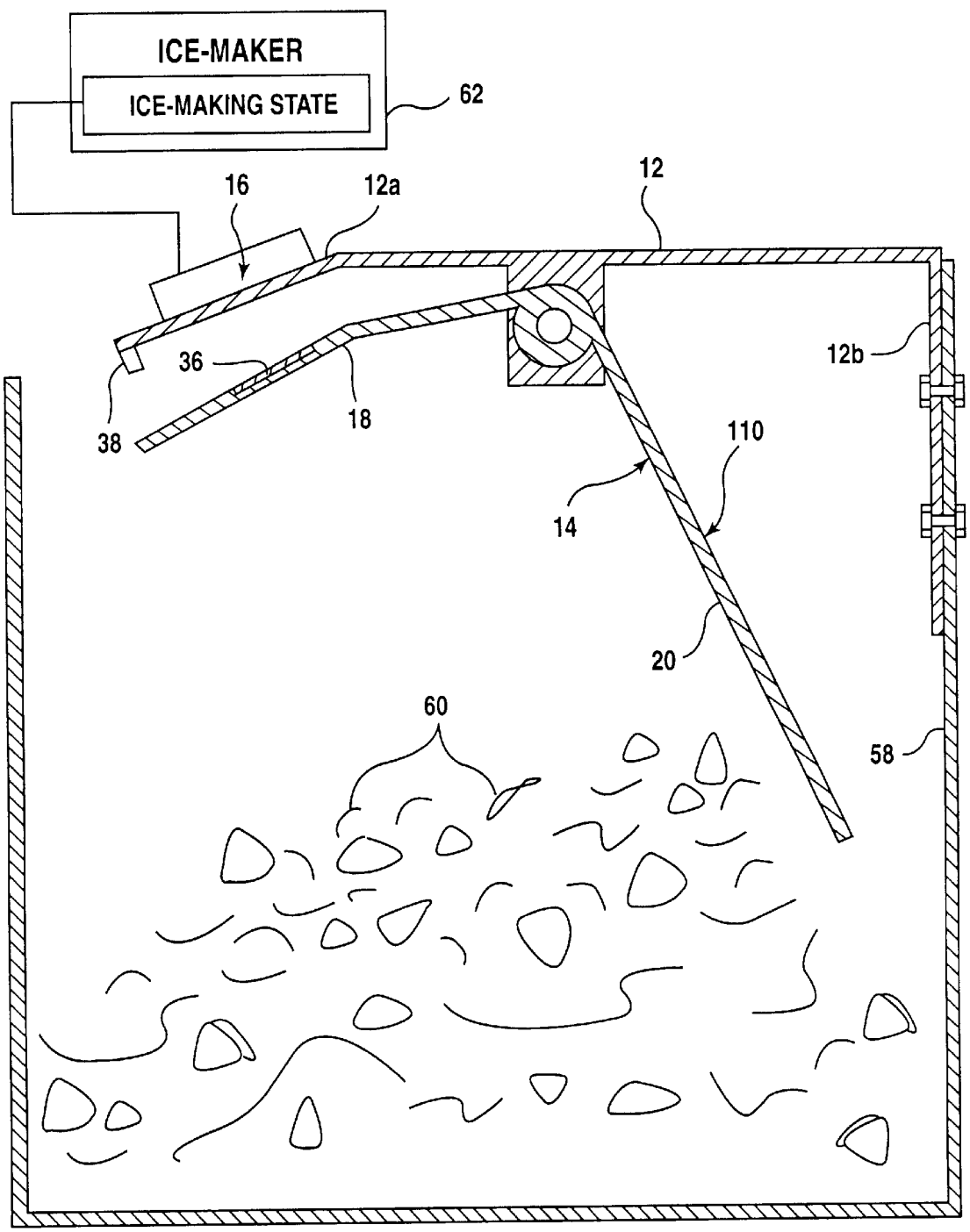
FIG. 8 is a side elevational view in cross-section of the ice level detector of the invention in FIG. 6 with the ice maker machine in the shut-off state.

A second exemplary embodiment of an ice level detector 110 of the invention is illustrated in FIGS. 6–8. The second exemplary embodiment of the ice level detector 110 of the invention is similar to the first exemplary embodiment of the ice level detector 10 of the invention that is described above. However, several of the features of the second exemplary embodiment of the ice level detector 110 of the invention are different.

For the second exemplary embodiment of the ice level detector 110 of the invention, the switch mechanism 16 is a magnetic switch. As best shown in FIGS. 7 and 8, the switch mechanism 16 includes a magnet 36 that is connected the first arm member 18. Also, the proximal end portion 12a of the bracket 12 bends angularly downwardly relative to the longitudinal axis L. Correspondingly, the first arm member 18 also bends so that the magnet 36 can face the switch mechanism 16 in close proximity thereto when the first arm member 18 is positioned at the first angle af. Also, a stop element 38 is connected to the proximal end portion 12a of the bracket 12 as shown in FIGS. 6–8. The stop element 38 is operative for preventing the first arm member 18 from contacting the bracket 12. One of ordinary skill in the art would appreciate that the stop element 38 can also be connected to the first arm member 18 to achieve the operational purpose of the stop element 38. Also, the distal end portion 12b extends perpendicularly downwardly relative to the longitudinal axis L.

Figure 9:
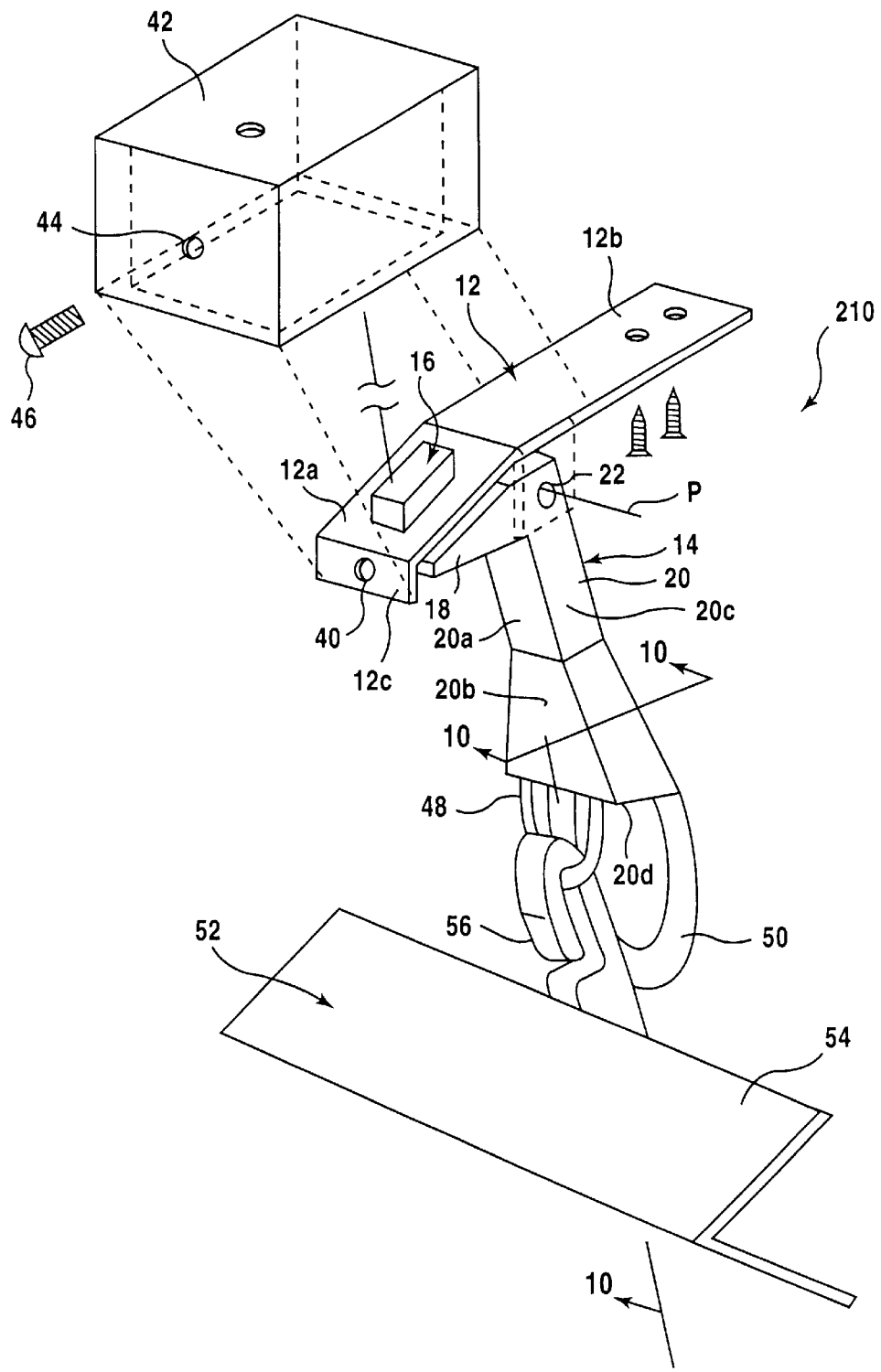
FIG. 9 is a partially exploded perspective view of the third exemplary embodiment of the ice level detector of the invention.
Figure 10:
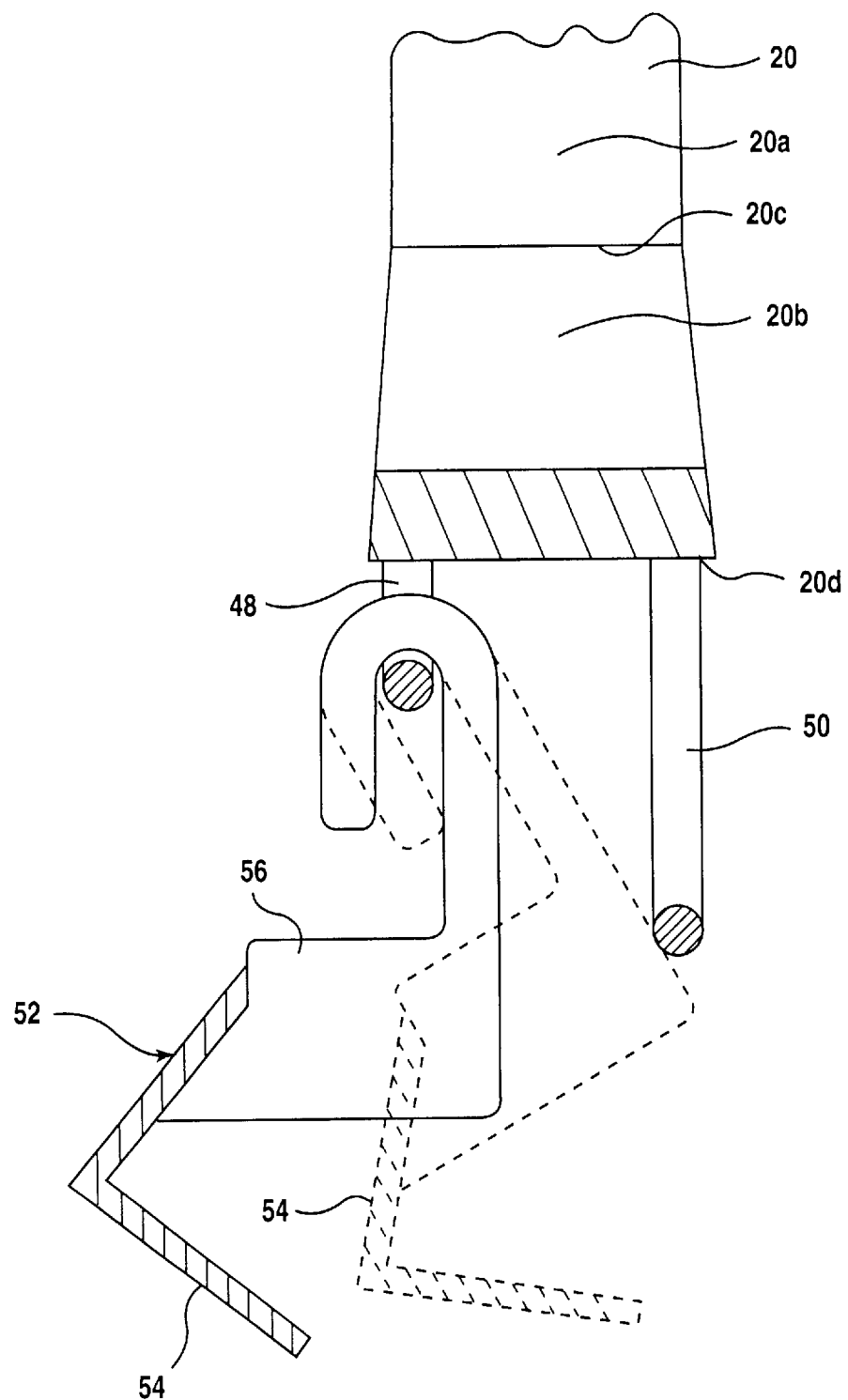
FIG. 10 is a side elevational view taken partially in cross-section along line 10—10 in FIG. 9 of a second arm member of an actuator lever.

A third exemplary embodiment of an ice level detector 210 of the invention is introduced in FIGS. 9 and 10. The third exemplary embodiment of the ice level detector 210 of the invention is similar to the first and second exemplary embodiments of the ice level detectors 10 and 110 of the invention described above. However, there are distinctive features.

The switch mechanism 16 is a proximity sensor that senses whether the first arm member 18 of the actuator lever 14 is disposed within a detecting vicinity of the proximity sensor, as is well known in the art. Also, the proximal end 12a of the bracket 12 includes an end piece 12c. The end piece 12c of the bracket 12 extends perpendicularly to the longitudinal axis L and includes a mounting hole 40. It is preferred that the third exemplary embodiment of the ice level detector 210 of the invention includes a housing 42. The housing 42 is sized and adapted to cover at least the switching mechanism 16 and the proximal end portion 12a of the bracket 12. A housing hole 44 extends through a front wall of the housing 42 and receives a conventional mounting bolt 46 for releasably connecting the housing 42 to the end piece 12c of the bracket 12, as is well known in the art.

For the third exemplary embodiment of the ice level detector 210 of the invention, the second arm member 20 includes a rectangular portion 20a and a trapezoidal portion 20b. The rectangular portion 20a is connected at one end at the elbow 22 and, at an opposite end, to the trapezoidal portion 22b. The trapezoidal portion 20b of the second arm member 20 has a narrow end 20c and an opposite broad end 20d. The trapezoidal portion 20b is connected to the rectangular portion 20a at the narrow end 20c. Further, the second arm member 20 includes a forward loop element 48 and a rearward loop element 50. The rearward loop element 50 is larger than the forward loop element 48. The forward loop element 48 and the rearward loop element 50 are connected to the broad end 20d of the trapezoidal portion 20b in a tandem relationship with one another with the forward loop element 48 positioned closer to the first arm member 18 than the rearward loop element 50 as best shown in FIG. 9.

The third exemplary embodiment of the ice level detector 210 of the invention also includes an ice plow member 52.

The ice plow member 52 has an. elongated angled body portion 54 and a hook 56. The hook 56 is connected to the angled body portion 54 and is sized to capture the forward loop element 48 so that the angled body portion 54 pivotably hangs therefrom. The angled body portion 54 extends generally parallel to the pivot axis P and pivots about the forward loop element 48 as best shown in FIG. 10. Note, however, that the ice plow member 52 contacts the rearward loop element 50 to prevent the ice plow member 52 from further pivoting about the forward loop element 48.

By way of example, in FIGS. 2–5, the ice level detector of the invention is used within an ice bin 58 to detect a full ice level state (FIGS. 3 and 8) of ice 60 in the ice bin 58 in order to cause an ice-maker machine 62 to change between an ice-making state (FIGS. 2, 4 and 7) and when the ice 60 is less than the full ice level state, a shut-off state (FIGS. 3, 5 and 8), when the full ice level state is detected. Also, either the ice maker machine 62 or the ice bin 58 forms a support structure so that the ice level detector can be connected to the support structure (i.e., either to the ice maker 62 or the ice bin 58 as illustrated in FIGS. 2, 3, 7 and 8). As shown in FIGS. 2, 3, 7 and 8, the second arm 20 projects into the ice bin 58 and is angularly movable in unison with the first arm member 18. The switch mechanism 16 is connected to the bracket 12 and is operative to cause the ice maker machine 62 to be in either the ice-making state (FIGS. 2, 4 and 7) or the shut-off state (FIGS. 3, 5 and 8). The switch mechanism 16 causes the ice maker machine 62 to be in the ice-making state when the second arm member 20 is disposed within the ice bin 58 at an ice-making position as shown in FIGS. 2, 4 and 7. With the second arm member 20 in the ice-making position, the first arm member 18 either contacts or is in a position adjacent the switch mechanism 16.

The switch mechanism 16 also causes the ice maker machine 62 to be in the shut-off state. (FIGS. 3, 5 and 8) when the second arm member 20 is disposed within the ice bin 58 at a stop ice-making position as shown in FIGS. 3, 5 and 8. When the second arm member 20 is at the stop ice-making position, the first arm member 18 is disposed apart from the switch mechanism 16. As best shown in FIG. 3, the ice 60 accumulating in the ice bin 58, which is being produced by the ice maker machine 62 in the ice-making state, applies a force F to the second arm member 20 to move the second arm member 20 from the ice-making position to the stop ice-making position. One of ordinary skill in the art would appreciate that when the second arm member 20 is in the ice-making position, the first arm member 18 is positioned at the first angle af as shown in FIG. 4. Correspondingly, when the second arm member 20 is disposed at the stop ice-making position, the first arm member 18 is disposed at the second angle as as shown in FIG. 5.

With reference to FIGS. 4 and 5, it is preferable that the ice level detector also includes a controller 64 that is in communication with via cable 66 with the switch mechanism 16 and the ice maker machine 62. It would be appreciated by one of ordinary skill in the art that the controller 64 is operative in causing the ice maker machine 62 to change between the ice-making state and the shut-off state based upon signals received from the switch mechanism 16.

Note that the distal portion 12b of the bracket 12 includes, by way of example only, a pair of holes for mounting the ice level detector to the support structure being either the ice maker machine 62 as shown in FIGS. 2 and 3 or to the ice bin 58. Also, the second arm member 20 is weight bias towards the ice-making position. Thus, as the force F lessens, the actuator lever 14 moves or tends to move counterclockwise. Once the actuator lever moves to a degree that a first arm member is disposed at the first angle $a_f$, the ice maker machine 62 begins producing ice because the ice maker machine is now in the ice-making state.

It will be appreciated by one of ordinary skill in the art that changes may be made to the above-described exemplary embodiments of the invention without departing from the inventive concepts thereof. It is understood, therefore, that the invention is not limited to the particular embodiments disclosed but is intended to encompass any modifications which are within the scope and spirit of the invention.

What is claimed is:

1. An ice level detector, comprising:
  a bracket extending along and laterally from a longitudinal axis;
  an actuator lever having a first arm member and a second arm member angularly attached to each other to form an elbow, the actuator lever pivotably connected to the bracket at the elbow for pivotable movement about a pivot axis extending perpendicularly to the longitudinal axis, the first and second arm members extending away from each other relative to the elbow and downwardly relative to the longitudinal axis; and
  a switch mechanism operative in conjunction with the bracket and the first arm member for providing a first signal when the first arm member is disposed adjacent the switch mechanism at a first angle less than a threshold angle and a second signal when the first arm member is disposed apart from the switch mechanism at a second angle greater than the threshold angle.

2. An ice level detector according to claim 1, wherein the first arm member has a first arm length and the second arm member has a second arm length, the second arm length being longer than the first arm length.

3. An ice level detector according to claim 1, wherein the bracket includes a pair of downwardly depending hanger tabs spaced apart from one another at a distance for receiving the elbow.

4. An ice level detector according to claim 3, further comprising a pivot pin sized and adapted for extending through the pair of hanger tabs and the elbow.

5. An ice level detector according to claim 1, wherein the switch mechanism comprises a damper switch, magnetic switch or a proximity sensor.

6. An ice level detector according to claim 1, wherein the bracket has a proximal end portion and a distal end portion disposed opposite the proximal end portion, the proximal end portion being connected to the switch mechanism.

7. An ice level detector according to claim 6, wherein the proximal end portion bends angularly downwardly relative to the longitudinal axis.

8. An ice level detector according to claim 7, wherein the proximal end includes an end piece extending perpendicularly to the longitudinal axis.

9. An ice level detector according to claim 8, further comprising a housing sized and adapted to cover at least the switching mechanism and the proximal end portion and adapted to releasably connect to the end piece.

10. An ice level detector according to claim 6, wherein the distal end portion extends perpendicularly relative to the longitudinal axis.

11. An ice level detector according to claim 1, further comprising a stop element connected to one of the bracket and the first arm member for preventing the first arm from contacting the bracket.

12. An ice level detector according to claim 1, wherein the second arm member includes a rectangular portion and a trapezoidal portion, the rectangular portion connected to the elbow at one end and to the trapezoidal portion at an opposite end.

13. An ice level detector according to claim 12, wherein the trapezoidal portion has a narrow end and an opposite broad end, the trapezoidal portion being connected to the rectangular portion at the narrow end.

14. An ice level detector according to claim 13, wherein the second arm member includes a forward loop element and a rearward loop element larger than the forward loop element, the forward loop element and the rearward loop element connected to the broad end in tandem with one another with the forward loop element positioned closer to the first arm member than the rearward loop element.

15. An ice level detector according to claim 14, further comprising an ice plow member having an elongated angled body portion and a hook connected to the angled body portion, the hook sized to capture the forward loop element so the angled body portion freely hangs therefrom, extends parallel to the pivot axis and pivots about the forward loop element at least until the ice plow member contacts the rearward loop element.

16. An ice level detector for use within an ice bin to detect a full ice level state of ice in the ice bin in order to cause an ice maker machine to change between an ice-making state and a shut-off state when the full ice level state is detected, one of the ice bin and the ice maker machine forming a support structure, the ice level detector comprising:

a bracket extending along and laterally from a longitudinal axis and connected to the support structure;

an actuator lever having a first arm member and a second arm member attached to each other at respective ends to form an elbow, the actuator lever pivotably connected to the bracket at the elbow for pivotable movement about a pivot axis extending perpendicularly to the longitudinal axis, the first and second arm members extending away from each other relative to the elbow and downwardly relative to the longitudinal axis with the second arm member projecting into the ice bin and angularly movable in unison with the first arm member; and a switch mechanism connected to the bracket and operative to cause the ice maker to be in the ice-making state when the second arm member is disposed within the ice bin at an ice-making position rendering the first arm member to be in contact with or adjacent the switch mechanism and to cause the ice maker to be in the shut-off state when the second arm member is disposed within the ice bin at a stop ice-making position rendering the first arm member to be disposed apart from the switch mechanism, wherein the ice accumulating in the ice bin and being produced by the ice maker in the ice-making state applies a force to the second arm member to move the second arm member from the ice-making position to the stop ice-making position.

17. An ice level detector according to claim 16, wherein the support structure is one of the ice maker machine and the ice bin.

18. An ice level detector according to claim 16, wherein the second arm member is weight biased towards the ice-making position.

19. An ice level detector according to claim 16, further comprising a controller in communication with the switch mechanism and the ice maker machine for causing the ice maker machine to change between the ice making state and the shut-off state based upon signals received from the switch mechanism.

20. An ice level detector comprising:

bracket means extending along and laterally from a longitudinal axis actuator lever means having a first arm member and a second arm member angularly attached to each other to form an elbow, the actuator lever pivotably connected to the bracket at the elbow for pivotable movement about a pivot axis extending perpendicularly to the longitudinal axis, the first and second arm members extending away from each other relative to the elbow and downwardly relative to the longitudinal axis; and switch means operative in conjunction with the bracket and the first arm member for providing a first signal when the first arm member is disposed adjacent the switch mechanism at a first angle less than a threshold angle and a second signal when the first arm member is disposed apart from the switch mechanism at a second angle greater than the threshold angle.

* * * * *